Sept. 26, 1933.  A. D. CRISSINGER  1,928,558

BRAKE FOR AUTOMOBILES

Filed Aug. 26, 1930

Inventor
A. D. Crissinger
By Chas. J. Williamson
Attorney

Patented Sept. 26, 1933

1,928,558

UNITED STATES PATENT OFFICE 1,928,558

BRAKE FOR AUTOMOBILES

Alfred D. Crissinger, Greensburg, Pa.

Application August 26, 1930. Serial No. 477,926

1 Claim. (Cl. 188—80)

Primarily, my invention concerns automobile brakes and I illustrate in the drawing and shall describe a construction suitable for that particular application, but it is to be understood that such application is merely by way of illustration or exemplification of one application of my invention, and I, therefore, do not restrict only to that instance of its application. The object of my invention is to provide a brake which will be powerful in action, may be applied without undue violence in stoppage of the vehicle or the motion of the part to be arrested or stopped and will eliminate objectionable friction and thus avoid heating and sticking, and will prolong the useful life of the brake parts.

My invention consists in whatever is described by or is included within the terms or scope of the appended claim.

In the drawing:—

Figure 1:
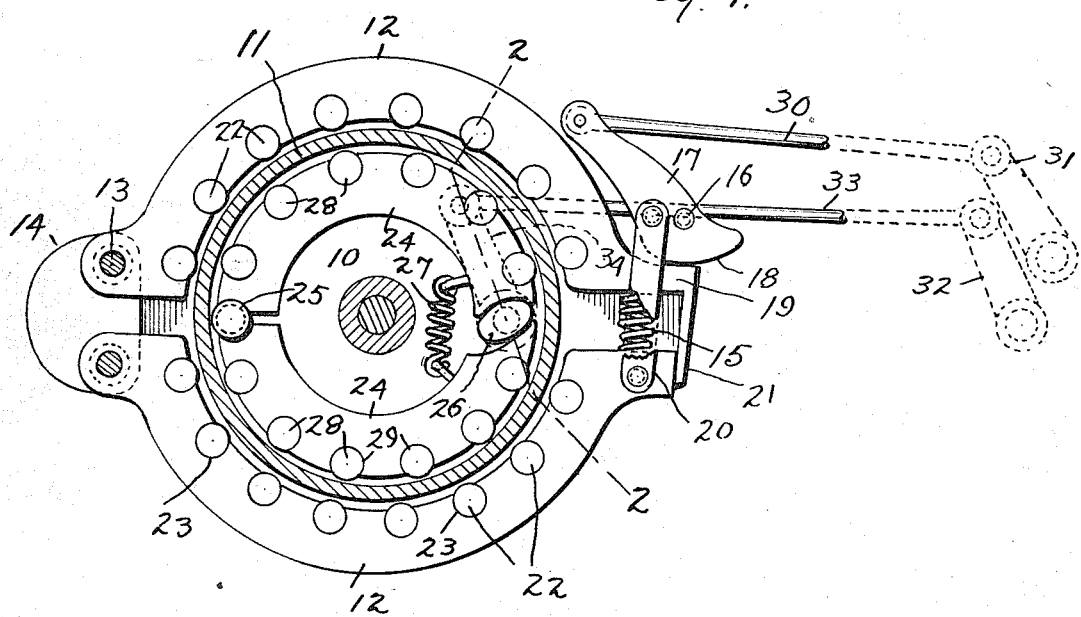
Fig. 1 is a side elevation of an automobile brake embodying my invention with the brake drum shown in section.
Figure 2:
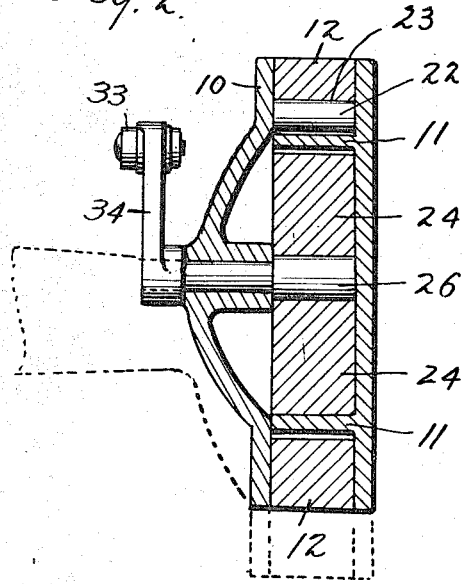
Fig. 2 is a section on the line 2—2 of Fig. 1.
Figure 3:
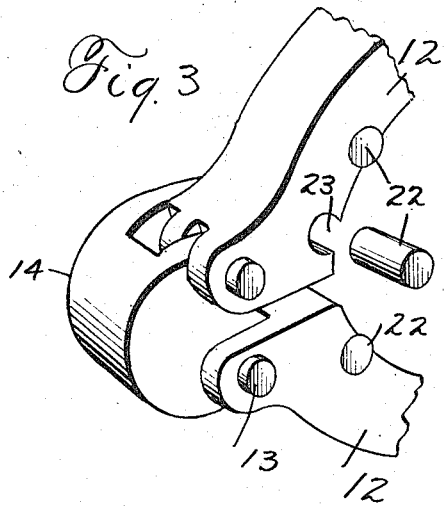
Fig. 3 is a detail view in perspective showing the pivoted portions of the outer shoes.

Describing in detail what is shown in the drawing, the axle at the inner side of the wheel has a non-rotary or stationary disc, 10, concentric with which is the brake drum, 11, with both the inner and outer peripheries of which sets of inner and outer brake shoes cooperate, so that simultaneously if desired, braking action may be produced on both the outer and inner peripheries of the drum. The drum as shown in Fig. 2, may have a side plate that extends out to the outer edge of the outer shoes, but I do not limit myself to such an arrangement.

The outer shoes are two segments or arcuate arms, 12, which together substantially encircle the brake drum, one, of course, being diametrically opposite the other; and they are pivoted at the corresponding extremities by pivots, 13, to a radial extension, 14, of the axle member, 10, so that they may swing towards and from the brake drum. Between their free ends is interposed a coil spring, 15, which tends normally to thrust them apart and keep them out of contact with the outer periphery of the brake drum.

Pivoted by a pivot, 16, to a lateral extension of the axle member adjacent the free end of one of the shoes, 12, is a lever, 17, which at one end has an eccentric or cam surface, 18, to engage an outward extension, 19, of said shoe, so that when said lever is rocked in one direction, it will move said shoe towards and in contact with the brake drum. A pair of links, 20, pivotally connected at one end to said lever and at the other end to the free end of the other shoe, 12, by such rocking movement of the lever, pull or draw the other shoe, 12, to and in contact with the brake drum. Said links straddle the lever and shoes on opposite sides and cover the coil spring, 15. The shoe extension, 19, has a right angle prolongation, 21, that reaches across the space between the outer side of the free ends of the two shoes to provide a dust-proof cover for such space.

On the inner periphery of each shoe, 12, is a series of parallel rollers, 22, each seated in an axially extending hole, 23, that is a little more than a semi-cylinder in the inner side of the shoe so that while the periphery of the roller projects beyond the inner periphery of the shoe, the roller will nevertheless be restrained from radial displacement. The projection of the rollers beyond the inner surface of the shoe is to cause contact of the rollers with the brake drum and thereby eliminate sliding friction such as would occur were the inner periphery of the brake shoe to contact with the brake drum and yet the friction of each roller on the walls of its hole or socket will prevent too free rotation of the rollers that would result in inadequate braking pressure on the brake drum. It will be evident that the contact of the rollers with the brake drum will render application of braking pressure to the drum easy and gentle and without shock and with reduction of wear of parts from friction.

A pair of arcuate shoes, 24, is situated within the brake drum each being substantially semicircular and the two at one end being pivoted or fulcrumed on a pin, 25, and at the diametrically opposite point having interposed between their free ends at such point an elliptical cam, 26, pivoted to rotate in a bearing in the axle member so that by rotation in one direction the cam will spread the two shoes apart and into contact with the inner periphery of the drum and when rotated in the opposite direction will permit the shoes to be drawn together and removed from contact with the brake drum under the pull of a coil spring, 27, which is connected at opposite ends to the free ends of said shoes on the inside thereof.

The inner shoes as in the case of the outer shoes, do not have direct contact with the brake drum but on their outer sides they are equipped with rollers, 28, each mounted in a socket, 29, the same as in the case of the outer shoes so that there is rolling contact with the brake drum when the inner shoes are moved outward to exert braking pressure thereon.

The outer and inner shoe moving cams have each its own operating device which may be a suitable treadle located for convenient access of the car driver and the two treadles may be so-arranged that if desired the same foot may be used to operate both or either.

Under some conditions the desired braking pressure may be applied through one set of brake shoes and under other conditions it may be desirable to simultaneously apply both sets of shoes. Merely for sake of illustration, I show the outer shoe operating cam lever connected by a rod, 30, with a crank, 31; and the inner shoe spreading cam connected with a lever, 32, by means of a rod, 33 that thence extends to a crank arm, 34, on the cam shaft.

What I claim is:—

A brake having a drum, arcuate arms encircling the brake drum pivoted at adjacent extremities and carrying rollers on their sides next the drum periphery, a pair of links straddling the opposite ends of said arms and pivoted at one end to one of said arms, a spring situated between such ends of the arms tending to move the rollers thereof away from the brake drum, and a lever pivoted to the other ends of said links between them having a cam surface acting on the adjacent arm end.

ALFRED D. CRISSINGER.